Nov. 4, 1952     T. J. SMULSKI     2,616,112
WINDSHIELD WIPER
Original Filed Feb. 10, 1945
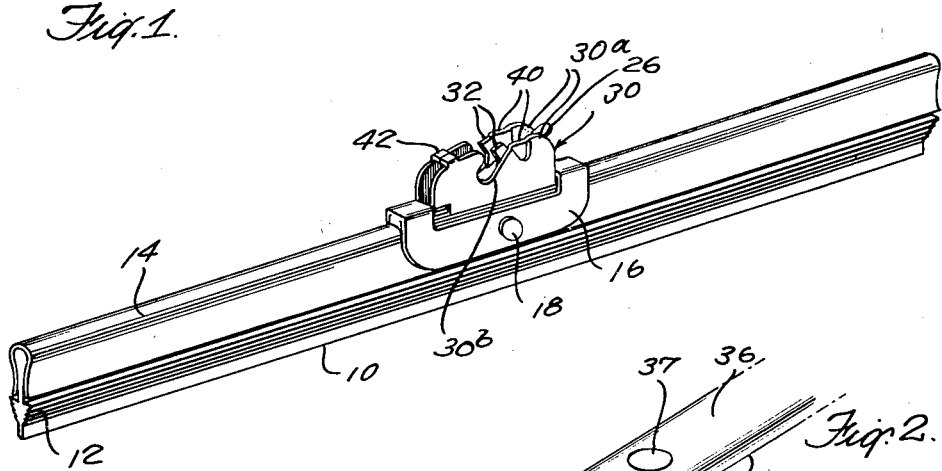
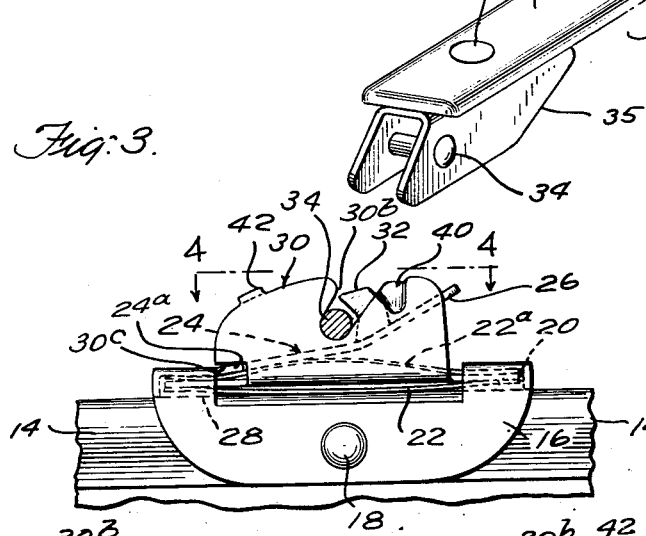
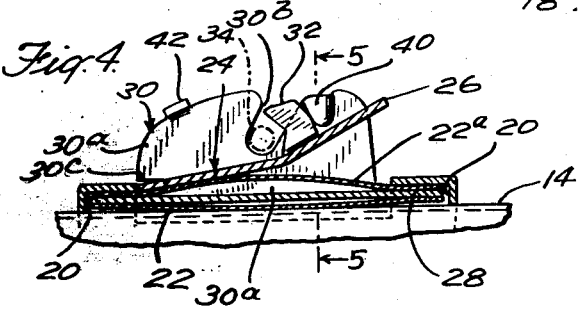
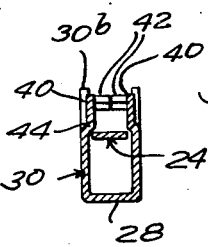
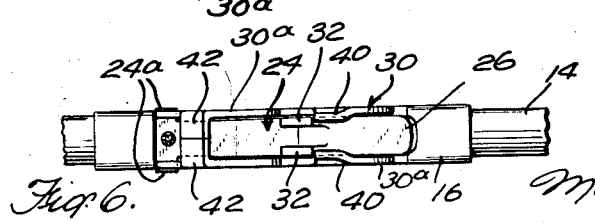
INVENTOR.
THEODORE J. SMULSKI
BY
ATTORNEYS Patented Nov. 4, 1952

2,616,112

UNITED STATES PATENT OFFICE 2,616,112

WINDSHIELD WIPER

Theodore J. Smulski, Gary, Ind., assignor to Productive Inventions, Inc., a corporation of Indiana Continuation of application Serial No. 577,186, February 10, 1945. This application September, 14, 1946, Serial No. 697,038

20 Claims. (Cl. 15—250)

This invention relates to improvements in windshield wipers. More particularly, it relates to improvements in means for locking the wiper blade to the wiper arm of the kind disclosed in a copending application of John W. Anderson Serial No. 526,744, filed March 16, 1944, now Patent 2,432,693, December 16, 1947, for Wiper Blade Connector Mechanism.

The primary object of the present invention is to provide assurance that the wiper blade will remain operatively associated with the wiper arm under the most extreme conditions of operation and notwithstanding rough or careless treatment on the part of servicing attendants or others.

This application is a continuation of my copending application Serial No. 577,186 filed February 10, 1945 for Windshield Wipers, since abandoned.

The loss of a windshield wiper is regrettable under any conditions because the wiper has value. Of immeasurably greater importance, however, is the fact that the wiper is a safety instrumentality and that the loss of it from a vehicle traveling at high speed is apt to result in the loss of the vehicle, its cargo and its passengers.

In aircraft, windshield wipers are exposed to wind velocities created by extremely high air speeds, sometimes in excess of 500 miles per hour. Although the fuselage and wings are streamlined to facilitate nonturbulent flow of air, the windshield wiper is not thereby protected, and the wiper arm must bear the full brunt of such head winds.

It is necessary that the wiper blade contact the windshield uniformly across its wiping edge with sufficient pressure to remove the accmulation of moisture and at times dirt, so as to provide a clean area of the windshield through which the operator can see. This pressure is generally obtained by means of a spring forming a unitary part of the wiper arm assembly. The greater the speed of the vehicle, the greater must be the pressure applied, and the more rapid must be the operation of the wiper if it is to function effectively. This means that in a high speed vehicle such as an airplane a relatively high powered motor must be employed, the forces to which the wiper arm and the connection between the wiper arm and wiper blade are exposed being increased all around.

It is desirable that the weight of the windshield wiper blade and of the windshield wiper arm be held at a minimum consistent with competence for required performance. It is also desirable that the width of the blade and of the arm be kept at a minimum so that the obstruction to vision will be minimized. Because of these and other considerations the dimensions within which means must be provided for locking the blade to the arm, to secure the blade against accidental dislocation, must be held within very narrow limits as to space and weight.

In order to avoid damage by careless attendants and to meet extraordinary conditions such as those encountered in the high speeds of aircraft with correspondingly high air velocities, as well as excessive air velocities encountered in land vehicles, it has been found desirable to provide added strength with the wiper disclosed in U. S. Patent 2,432,693 to resist accidental severance of the blade from the arm. Because of the narrow limitations of the space and weight this has introduced a serious problem in connection with a structure like that illustratively disclosed in the copending application referred to. The resistance to severance of the assembly is limited by the capacity of a locking lever to resist distortion. While this capacity of the locking lines in a structure like that in Patent 2,432,693 is adequate to perform satisfactorily the function of the locking mechanism under all normal conditions, it has been found desirable that such resistance be increased, and it is to the attainment of that object that the present invention is directed.

It is a salient feature of the invention that such added strength is provided in a structure like that in Patent 2,432,693 without adding to the weight of the materials employed, and without adding to the cost of manufacture of the wiper and wiper arm.

Other objects and advantages will hereinafter appear.

In the drawing forming part of this specification,

Figure 1 is a perspective view of a wiper blade assembly made in accordance with the invention;

Figure 2 is a fragmentary, perspective view, on a slightly larger scale than Figure 1, showing an end portion of a wiper arm and including a connector member affixed thereto;

Figure 3 is a fragmentary view in sectional, side elevation, illustrating portions of the arm and blade carried connectors in cooperative engagement with one another;

Figure 4 is a vertical sectional view taken along line 4—4 of Figure 3 looking in the direction of the arrows, a portion of the structure being broken away to show more clearly the nature of the positive locking means;

Figure 5 is a vertical sectional view taken along line 5—5 of Figure 4, looking in the direction of the arrows, but slightly modified to show more clearly restraining protuberances which are provided in the walls of the housing; and Figure 6 is a fragmentary view showing the locking mechanism carried by the wiper blade.

As stated previously, a wiper blade assembly consists of a wiper blade 10 generally made from rubber, which is mounted in a metallic frame or retaining channel 14. Atop and about midway of the length of the frame 14, there is firmly mounted a "saddle" holder or cage clip 16. This clip is fastened to the frame 14 by means of a rivet 18.

In recesses 20 of the clip 16 fits a bowed spring member 22 which engages at its ends with the blade frame member 14 and intermediate its ends with the base portion 28 of a saddle or housing 30. The saddle 30 includes the base portion 28 whose ends are trapped in the cage clip, and parallel, forwardly extending side walls 30a which are formed with slots 30b.

Mounted between the walls of housing 30 is a lever 24, one end of which is broad to provide ears 24a which extend into recesses or slots 30c formed in the walls 30a. The ears 24a have shoulders which bear against the bases of the slots 30c and rock against said shoulders. The lever 24 inclines forward from the spring end 22a and extends slightly beyond the housing 30 to provide a handle portion 26. Locking lugs 32 extending vertically and at right angles to the face of the lever 24, are integral parts of the lever. These lugs 32 are so located on the arm 24, that as they are moved forward by a spring 22a, they are caused to engage and imprison the cross connector pin 34 in the slots. It will be noted that the lugs are preferably formed to provide recesses which receive the pin 34. The pin 34 is part of the wiper arm 36, being secured across a connector member 35 which is permanently secured to wiper arm 36 by a rivet 37.

The lever 24 is urged forward by a bowed spring 22a. The spring is disposed in front of the base 28, extending through the channel of the housing 30 and having its ends trapped in the pockets 20 of the clip 16. The spring 22a normally maintains the lugs 32 in their detaining or imprisoning positions.

Ears 42 formed on the walls 30a of the housing 30 are folded inward into abutting relation. These ears serve to reinforce and space the side walls 30a of the structure illustrated and described. They also may be utilized as a cross connector, however, for attaching the blade carried connector apparatus to wiper arm carried connectors of the hook type, as shown, for example, in Patent No. 2,290,140. This use of the ears 42 is illustrated in Figure 6 in Patent 2,432,693.

In use, the locking lugs 32 move arcuately crosswise of the slots 30b to obstruct withdrawal from the slots of the cross connector pin 34. It is a salient feature of the present invention that immediately adjacent, and in close juxtaposition with, the outer periphery of the arc through which the locking lugs 32 move is a pair of back stop lugs 40, the lugs being offset inwardly from the saddle walls 30a and integral with said walls. The lugs 40 positively support the lugs 32, preventing deformation and tearing loose of the arm 24. The reinforcement thus provided for the arm 24 assures that the wiper blade will not be jarred or torn loose from the shaft 34. The only way the wiper blade can be removed is by exerting positive rearward pressure upon the handle portion 26 of arm 24 to rock the lugs 32 to nondetaining positions.

The projecting lugs 40 are formed as previously mentioned, as inwardly displaced protuberances integral with the "saddle" or housing walls 30a. These lugs 40 serve as back stops for resisting any dislocating forces that may be applied directly or indirectly by the shaft 34 against the locking lugs 32.

It is advantageous to provide a slight space normally between lugs 32 and back stops 40 to permit free movement of lugs 32 into and out of detaining position, such space, however, need not be sufficient to permit enough distortion of lever 24 to cause a permanent set. It will be noted that the introduction of back stop 40, as compared with the construction in the copending application above mentioned, requires only a simple change in the dies in which the rocker 30 is formed. Once this change is made the cost of production remains the same as before.

These back stops, of which there are two, make the locking effect so positive that the resistance to severance meets fully the most extreme conditions. In fact, that resistance is so great that it cannot be overcome even under arbitrarily applied forces greatly exceeding any ever encountered in use, even on aircraft.

I have described what I believe to be the best embodiments of my invention. I do not wish, however, to be confined to the embodiments shown, but what I desire to cover by Letters Patent is set forth in the appended claims.

I claim:

1. In a windshield wiper mechanism including wiper arm and wiper blade members, the novel apparatus for automatically effecting a quickly separable but normally dependable connection of the blade and arm members comprising, in combination, a male connector secured to one of said members, a female connector secured to the other of said members and having side walls which are slotted to receive an engaging member carried by said male connector, a spring urged element carried by the female connector for movement between the said side walls and transversely of the slots between a retaining position in which it obstructs the entrance of the slots to oppose withdrawal of the engaging member from the slots and a non-retaining position in which it substantially clears the entrance of the slots to free the engaging member, said element being urged normally toward retaining position and normally maintaining such position, a surface formation operably connected to said element and engageable by the engaging member as an incident of the insertion of the latter into the slots and being operable thereby to non-retaining position, and back stop portions integral with said side walls of said female connector and displaced inwardly therefrom whereby the same may be engaged by said element to prevent displacement of said element.

2. In a windshield wiper mechanism including wiper arm and wiper blade members, the novel apparatus for automatically effecting a quickly separable but normally dependable connection of the blade and arm members comprising, in combination, a male connector secured to one of said members, a female connector secured to the other of said members and having side walls which are slotted to receive an engaging member carried by said male connector, a spring urged element carried by the female connector for movement between the said side walls and transversely of the slots between a retaining position in which it obstructs the entrance of the slots to oppose withdrawal of the engaging member from the slots and a non-retaining position in which it substantially clears the entrance of the slots to free the engaging member, said element being urged normally toward retaining position and normally maintaining such position, and a back stop portion integral with one of said side walls of said female connector and displaced inwardly therefrom whereby the same may be engaged by said element to prevent displacement of said element.

3. In a windshield wiper arm and blade assembly the combination of a resilient wiper element, a holder supporting said element, a connector member mounted upon said holder and constructed and arranged to permit lateral axial movement of said holder and wiping element with relation to said connector member and substantially within a predetermined range, a wiper arm provided adjacent its free end with an attaching member constructed and arranged to engage said connector member, one of the said members being provided with a recess, the other member being provided with an entering part constructed and arranged to enter said recess, said recessed member carrying a resiliently urged latch member constructed and arranged with relation to said recessed member to normally close said recess so as to retard the removal of said entering part, normally accessible manual means associated with said latch for displacing said latch member to permit the removal from said recess of said entering part, said attaching member being so constructed and arranged as to permit a pivotal action between said attaching member and said connector member in a plane substantially at right angles to the surface to be wiped, and means projecting into said connector providing a stop for said latch.

4. Means for establishing a connection between a windshield wiper blade unit and an operating arm unit comprising an elongated mounting adapted to be attached to one of said units, said connection means provided with an opening for receiving a male part provided on the other unit, said connection means and said mounting being constructed and arranged whereby said connection means may pivot about an axis with respect to said mounting, resilient means disposed on one side of the pivotal axis providing a resilient abutment for said connection means, yieldable locking means adjacent the other side of said axis whereby the male part may be locked in the opening of said connection means, and stop means disposed in said connection means for said yieldable locking means.

5. Means whereby a connection may be established between a windshield wiper blade unit and an operating arm unit comprising a mounting adapted to be attached to one of said units, said connection means and said mounting having end extremities constructed and arranged whereby said connection means may pivot about an axis with respect to said mounting, said connection means including a pair of walls provided with portions having recesses therein providing an opening for pivotally receiving a part carried by the other of said units, and resilient means including a portion tending to urge said connection means away from said mounting in at least one of the pivotal positions of said connection means and a portion arranged between the outer surfaces of said side walls which may be automatically depressed by the part to be held when the part is projected into the opening whereby to assist in holding the part connected to said connection means, and means disposed between said walls cooperable with said arranged portion to provide a more secure connection between such part and said connection means.

6. Means whereby a connection may be established between a windshield wiper blade unit and an operating arm unit, said connection means being adapted to be attached to one of said units and provided with an opening for the reception of an entering part on the other unit, recesses provided in said connection means, and yieldable holding means caught in said recesses and including portions forming recesses for receiving said entering part when it is projected into said opening whereby to assist in holding the connection means connected to said entering part, and stop means on the connection means for preventing excessive displacement of said holding means when such part is received in said opening.

7. A windshield wiper blade unit comprising a backing having a cleaning element secured thereto, a connector attached to said backing, said connector being generally of channel shape including an elongated base wall extending longitudinally of the backing and a pair of spaced apart side walls extending outwardly from said backing, a pair of slots provided in said side walls, a wiper arm, having a fitting secured at its free end, said fitting being generally of channel shape including a base wall and a pair of spaced side walls with the latter straddling the side walls of the connector, pivot means carried by the side walls of the fitting and extending crosswise through the slots in said connector to permit pivotal movement of the blade unit relative to the arm, holding means arranged in the connector for normally holding the pivot means in the slots, and the side walls of said connector having a pair of bent portions adjacent the slots assisting to provide a more secure connection between the pivot means and connector.

8. A connector for connecting a windshield wiper blade unit to an actuating arm unit, an elongated support mounted on said blade unit, said connector being carried by said support for rockable movement substantially about the longitudinal axis of said support, said connector including an elongated housing having a pair of spaced apart side walls, rounded abutment means provided on said housing, elongated yieldable means arranged in the housing between said walls and engaging said support, means for securing the yieldable means to the housing, said yieldable means and said abutment means being constructed and arranged whereby an entering part of the other unit may be disposed therebetween in a manner whereby to permit rockable movement between said housing and such a part, and a stop on the housing spaced from the securing means and being cooperable with the yieldable means whereby to assist in preventing accidental separation on the part from the housing.

9. A connector for connecting a windshield wiper blade unit to an actuating arm unit, a support mounted on one of said units, said connector being carried by said support for rockable movement about its longitudinal axis, said connector including an elongated housing, an opening provided in said housing, elongated yieldable means arranged substantially in said housing and having extremities disposed adjacent the ends of said housing to position an intermediate portion of said means relative to said opening whereby such intermediate portion may engage an entering part on the other unit when disposed in said opening, means for securing the yieldable means to the housing, and stop means carried by said housing and spaced from the securing means, said stop means and said yieldable means being cooperable to assist in holding the part and housing assembled.

10. A connector for connecting a windshield wiper blade unit to an arm unit, a mounting carried by one of said units, resilient means in the form of a strip associated with said mounting, means on said connector engaging said resilient means for resiliently supporting said connector, said connector being provided with bearing means, means movable with respect to the mounting operatively related to said resilient means and in coacting relationship with said bearing means for maintaining a part on the other unit relative to said bearing means, means for securing the movable means to the connector and means spaced from the securing means carried by said connector providing a stop for said movable means.

11. Means for connecting a windshield wiper blade unit to an actuating arm unit comprising a connector mounted on one of said units, said connector being provided with abutment means, resilient means associated with said one unit providing a resilient support for said connector to permit said connector to move relative to said unit, latch means, means for securing the latch means to the connector in operative relationship to said resilient means and in coacting relationship with said abutment means whereby a part on the other unit may be held between said abutment means and said latch means, and a stop on said connector adjacent said abutment means and spaced from the securing means for preventing excessive displacement of said latch means.

12. Connector means for connecting a windshield wiper blade unit to an arm unit, supporting means carried by one of said units providing a pivotal support for said connector means, and yieldable means operatively associated with said supporting means, said connector means being provided with an opening, said yieldable means being provided with a portion structurally related to said opening whereby a part on the other unit will move such portion when entering said opening, and means on said connector means cooperating with the said portion of said yieldable means for preventing accidental separation of such part from the connector when disposed in said opening.

13. An elongated connector for connecting a windshield wiper blade unit to an actuating arm unit, said connector being mounted on one of said units and provided with abutment means, a stop on said connector, yieldable means providing a yieldable support for said connector on said one unit, means spaced from the stop for securing the yieldable means in a predetermined operative position, and said yieldable means including a portion extending lengthwise within the connector and operatively related to said stop and said abutment means in a manner whereby such portion may engage and assist in holding a detachable connecting part on the other unit relative to said abutment means.

14. Connector means for establishing a connection between a windshield wiper blade unit and a wiper arm unit, said connector means comprising an elongated support adapted to be mounted on one of the units, said connector means being carried by the elongated support for rockable movement substantially about the longitudinal axis of said support, said connector means also including a housing having a pair of spaced apart side walls, elongated yieldable holding means having extremities disposed adjacent the ends of said connector means, means securing the yieldable holding means in a predetermined operative position, abutment means provided on said connector means, said yieldable holding means and said abutment means being constructed and arranged whereby an entering part adapted to be mounted on the other unit may be engaged by said yieldable holding means and said abutment means when inserted therebetween, and a stop on said connector means spaced from said securing means and cooperable with said yieldable holding means to prevent accidental displacement of such part from the connector means.

15. A connector for establishing a connection between a wiper blade unit and a wiper arm unit, said connector being adapted for attachment to one of such units and comprising a mounting, resilient means associated with said mounting, means on said connector cooperating with said resilient means for resiliently supporting said connector, said connector being provided with abutment means, holding means, means securing the holding means to the connector in operative relation with the resilient means, said holding means being movable with respect to the mounting and arranged in coacting relationship with said abutment means for holding a part on the other of such units relative to said abutment means, and stop means on said connector and spaced from the securing means, said stop means and said holding means being cooperable to prevent accidental displacement of such part from said connector when disposed relative to said abutment means.

16. A connector for establishing a connection between a windshield wiper blade unit and a wiper blade unit, said connector being adapted for attachment to one of the units and provided with abutment means, resilient means providing a resilient support for said connector, latch means, means securing the latch means in operative relationship to said resilient means and in coacting relationship with said abutment means whereby a part attached to the other unit may be detachably held between said abutment means and said latch means, and a stop on said connector and spaced from said securing means for influencing the holding action of said latch means.

17. Connector means for establishing a connection between a windshield wiper blade unit and a wiper arm unit, said connection means being adapted for attachment to one of such units, supporting means providing a pivotal support for said connector means, yieldable means, means securing the yieldable means substantially within the confines of said connector means in operative association with said supporting means, said connector means being provided with a wall having an opening therein, said yieldable means being provided with a portion structurally related to said opening in a manner whereby an entering part on the other unit may be engaged by said portion to hold the part in said opening, and means spaced from said securing means providing a stop for said yieldable means assisting to prevent accidental disconnection of such part from said connector means.

18. A connector for establishing a connection between a windshield wiper blade unit and a wiper arm unit, said connector being adapted for attachment to one of the units and provided with abutment means, yieldable means providing a yieldable support for said connector, means securing the yieldable means to the connector, said yieldable means including a portion operatively related to said abutment means in a manner whereby such portion may engage and assist in holding a detachable connecting part on the other unit relative to said abutment means, and additional means spaced from the securing means and providing a stop for said yieldable means assisting to prevent detachment of such a part from said connector.

19. A connector for establishing a connection between a windshield wiper blade unit and a wiper arm unit, said connector being carried by a support for attachment to one of the units, resilient means associated with said support and providing a resilient mounting for said connector, a latch associated with said connector, means securing the latch in operative relation to said resilient means for holding a detachable part on the other unit connected to said connector, and means spaced from said securing means and located on the connector providing a stop for said latch.

20. A connector for establishing a connection between a windshield wiper blade unit and a wiper arm unit, said connector being carried by a support for attachment to one of the units, resilient means associated with said support and providing a resilient mounting for said connector, a latch associated with said connector means securing the latch in operative relation to said resilient means for pivotally receiving and holding a detachable part on the other unit connected to said connector, and means spaced from the securing means and cooperable with the latch whereby to assist in preventing accidental separation of such part from said connector.

THEODORE J. SMULSKI.

REFERENCES CITED

The following references are of record in the file of this patent:

UNITED STATES PATENTS

| Number | Name | Date |
|---|---|---|
| 2,156,506 | Marcolivio | May 2, 1939 |
| 2,260,905 | Horton | Oct. 28, 1941 |
| 2,432,693 | Anderson | Dec. 16, 1947 |